United States Patent [19]

Nilssen

[11] Patent Number: 5,465,031

[45] Date of Patent: Nov. 7, 1995

[54] PROGRAMMABLE ACTUATOR FOR LIGHT DIMMER

[76] Inventor: Ole K. Nilssen, 408 Caesar Dr., Barrington, Ill. 60010

[21] Appl. No.: 25,740

[22] Filed: Mar. 3, 1993

Related U.S. Application Data

[63] Continuation-in-part of Ser. No. 465,612, Jan. 19, 1990, which is a continuation of Ser. No. 718,478, Apr. 1, 1985, abandoned.

[51] Int. Cl.$^6$ .................................................. H05B 37/02
[52] U.S. Cl. .......................... 315/362; 315/293; 315/360; 315/DIG. 4
[58] Field of Search .............................. 315/DIG. 4, 360, 315/362, 292, 293, 291; 307/141, 132 E, 140, 139

[56] References Cited

U.S. PATENT DOCUMENTS

| | | | |
|---|---|---|---|
| 3,889,132 | 6/1975 | Vreeland | 307/141 |
| 3,979,601 | 9/1976 | Franklin | 307/141 |
| 4,097,763 | 6/1978 | Saarem | 307/141 |
| 4,259,618 | 3/1981 | Nilssen | 315/360 |
| 4,349,748 | 9/1982 | Goldstein | 307/132 E |
| 4,360,739 | 11/1982 | Goldstein | 307/132 E |
| 4,521,843 | 6/1985 | Pezzolo | 315/360 |
| 4,642,726 | 2/1987 | Matsko | 307/141 |
| 4,645,942 | 2/1987 | Nilssen | 315/360 |
| 4,645,948 | 2/1987 | Nilssen | 315/360 |

OTHER PUBLICATIONS

Behavior Research Methods & Instrumentation, Graham, 1977 vol. 9(4), 395–396.

Primary Examiner—Robert J. Pascal
Assistant Examiner—Reginald A. Ratliff

[57] ABSTRACT

A self-contained programmable actuator can easily be mounted directly onto the outside of the face plate of a standard wall switch having a built-in light dimmer. This actuator can be programmed to adjust the position of the dimmer's mechanical control input in accordance with a program that automatically repeats on a diurnal, weekly or other cyclical basis. The actuator includes a small battery, a miniature electric motor with a gear/linkage mechanism operable to engage with and to move the dimmer's mechanical control input over its complete range, and a quartz-clock-based programming means having programming intput keys and time display means.

Once programmed by way of the programming input keys, the programming means is operative to actuate the electric motor in such manner as to move the dimmer's mechanical control input in accordance with the keyed-in program. In its anticipated most common operating mode, which includes an average total of six actuations per day, the small battery will last for years before needing replacement.

33 Claims, 2 Drawing Sheets

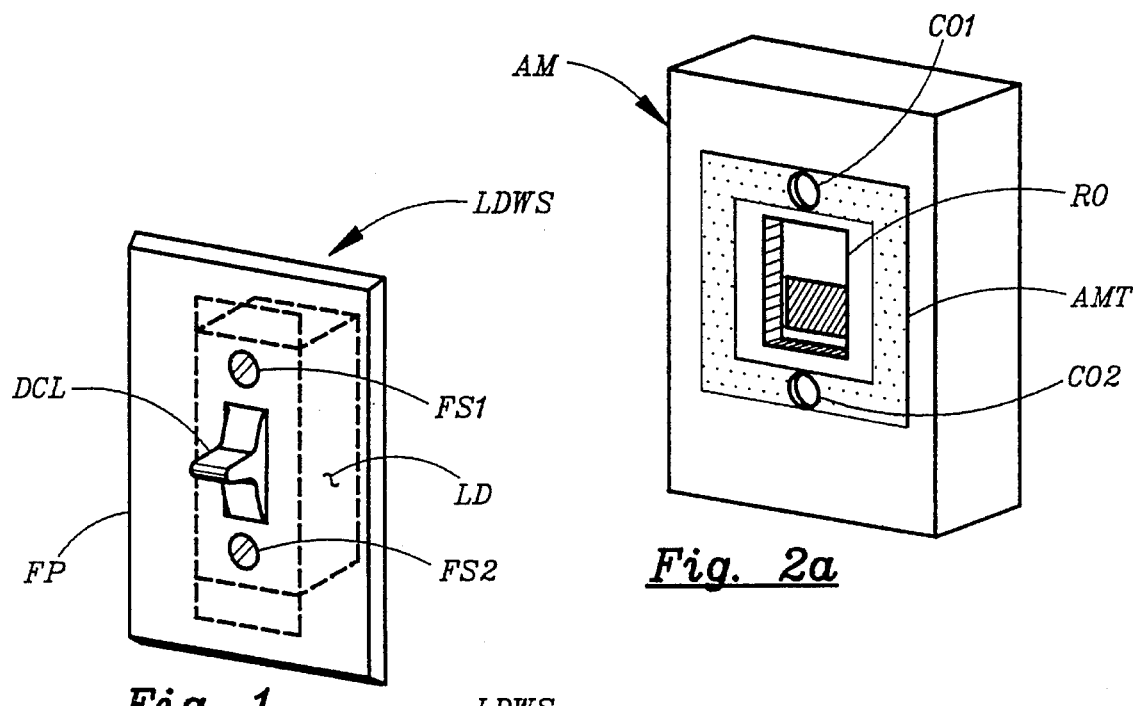
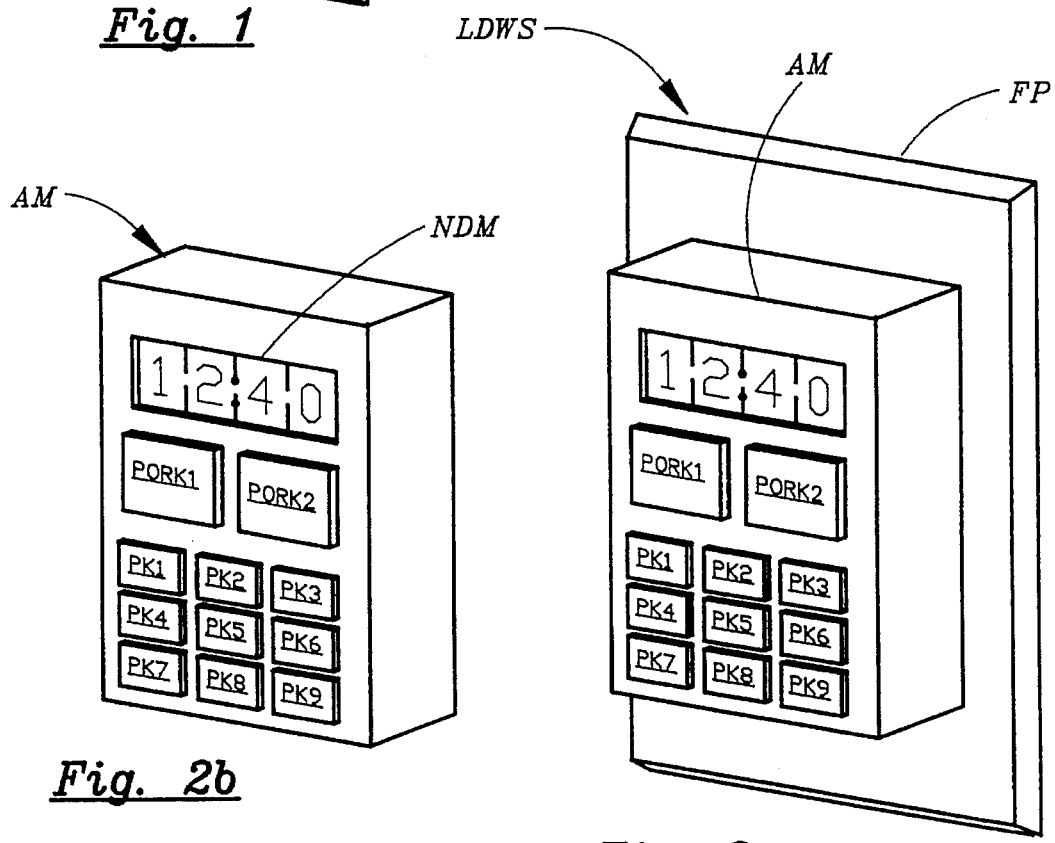

PROGRAMMABLE ACTUATOR FOR LIGHT DIMMER

This application is a continuation-in-part of Ser. No. 7/465,612, filed Jan. 19, 1990, which is a continuation of Ser. No. 6/718,478, filed Apr. 1, 1985, now abandoned.

BACKGROUND OF THE INVENTION

Field of Invention

The present invention relates to a self-contained means operable to actuate a light dimmer in accordance with a program that may be programmably fashioned to provide for various desired time-varying patterns of light output levels.

SUMMARY OF THE INVENTION

Brief Description

In its preferred embodiment, subject invention constitutes a self-contained programmable actuator means that can easily be mounted directly onto the outside of the face plate of a standard wall switch having a special light dimmer mounted therein. This special light dimmer is of the type having a control lever protruding through the opening in the face plate, with the specific position of this control lever determining the dimming level. Subject actuator means, which engages with this control lever, can be programmed to operate this lever in a proportional manner and in accordance with a program that automatically repeats on a diurnal, weekly or other more-or-less cyclical basis.

Subject actuator means comprises a small center-tapped battery, a miniature electric motor with a gear/linkage mechanism operable to engage with and to move the control lever to any desired specific position between its extreme fully-ON and fully-OFF positions, and a quartz-clock-based time-programming means having programming intput keys and time display means.

Once programmed by way of the programming input keys, the programming means is operative to actuate the electric motor in such manner as to move the control lever between different specific positions in accordance with the keyed-in program. In its anticipated most common operating mode, which includes a total of six actuations per day, the small battery will last for years before needing replacement.

BRIEF DESCRIPTION OF THE DRAWINGS

FIG. 1 represents an external view of a wall switch having a light dimmer with a control lever protruding through the aperture in the switch face plate.

FIG. 2 shows subject actuator means in two perspective views; FIG. 2a shows a view predominantly from the rear; and FIG. 2b shows a view predominantly from the front.

FIG. 3 shows the actuator means as mounted over the control ever on the face plate of a wall switch.

DESCRIPTION OF THE PREFERRED EMBODIMENT

Details of Construction

Figure 4:
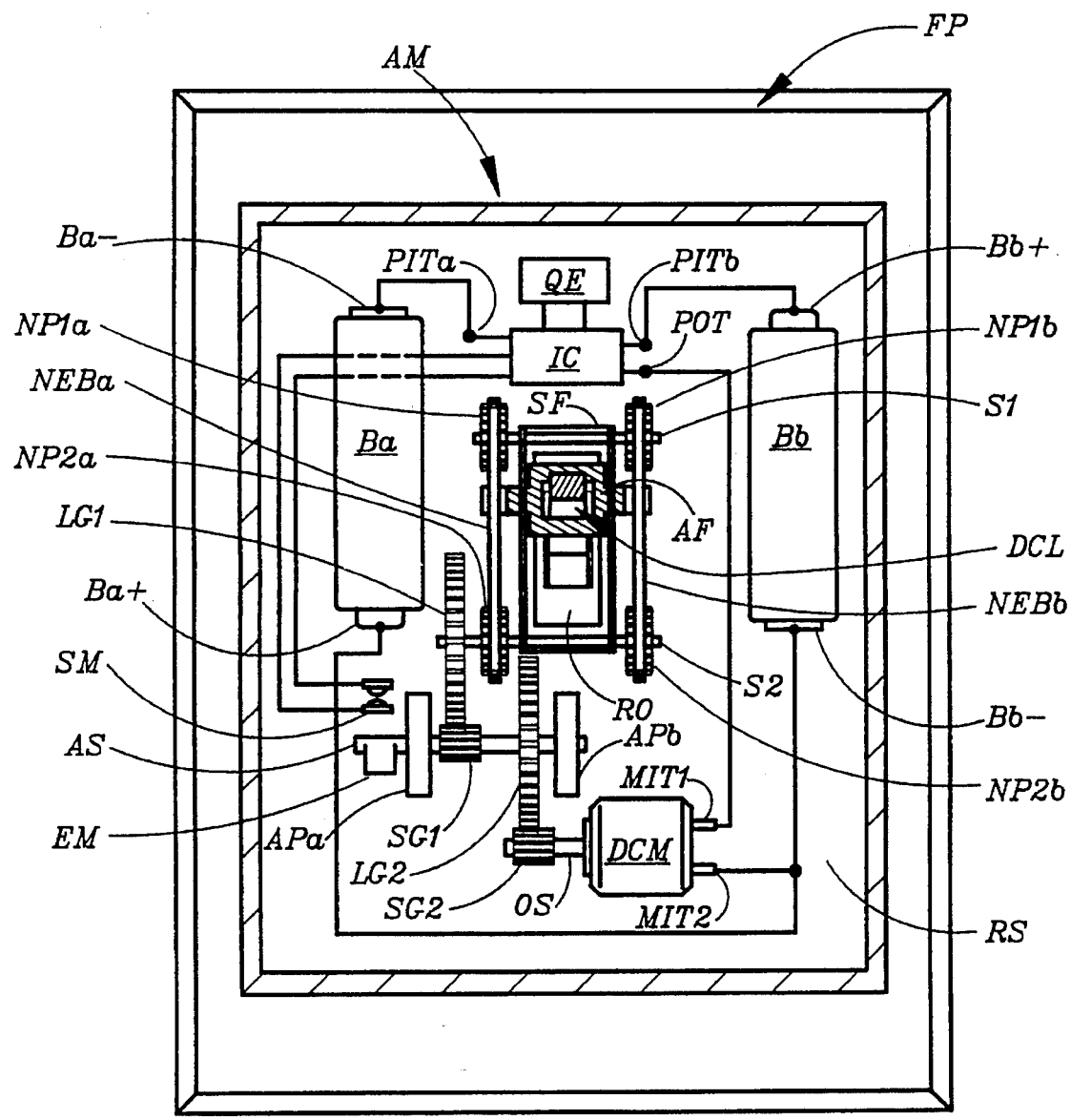
FIG. 4 represents a front view of the key components comprised within the actuator means.

FIG. 1 shows a mainly frontal view of a wall switch with a light dimmer LD (shown in phantom) having a dimming control lever DCL protruding through the opening in face plate FP.

FIG. 2a shows a view predominantly from the rear of subject actuator means. Positioned substantially in the middle of the rear surface of this actuator means is a rear opening RO operable to receive dimming control lever DCL.

Adhesive mounting tape AMT is positioned on the back surface of actuator means AM in a substantially rectangular fashion centered around the rear opening RO. Two cut-outs CO1 and CO2 have been provided in the tape so as to allow room for the heads of fastening screws FS1 and FS2 after actuator means AM is mounted onto faceplate FP.

FIG. 2b shows a view predominantly from the front of subject actuator means. Positioned near the top of the front surface is a numeric display means NDM, below which—positioned approximately in the center of the front surface—is a pair of relatively large size program over-ride keys PORK1 and PORK2. Near the bottom of the front surface is a set of nine calculator-type programming keys PK1 to PK9.

FIG. 3 shows actuator means AM mounted on light-dimming wall switch LDWS, being fastened right onto face plate FP by way of adhesive mounting tape AMT.

FIG. 4 shows a schematic frontal view of the inside of actuator means AM as mounted onto the face plate FP. Dimming control lever DCL, which protrudes through rear opening RO, is shown in its fully-ON position.

Surrounding the rear opening and fastened onto rear surface RS of the actuator means is a rectangular support frame SF. A first shaft S1 with notched pulleys NP1a and NP1b is supported by this frame near its upper extremity; a second shaft S2 with notched pulleys NP2a and NP2b is supported by this frame near its lower extremity. Both of these shafts are free to rotate, but are not free to move in any other respects.

A small notched endless belt NEBa connects pulley NP1a with pulley NP2a; and a small notched endless belt NEBb similarly connects pulley NP1b with pulley NP2b. Symmetrically fastened onto both of these endless belts is an actuator frame AF; which frame is so made and positioned as to embrace dimming control lever DCL. As the actuator frame AF moves, it slides on support frame SF.

Shaft S2 has an extension onto which is mounted a first large gear LG1. An auxiliary shaft AS is rotatably mounted between two auxiliary posts APa and APb; which posts are fastened to the rear surface RS. Mounted onto this auxiliary shaft is a second large gear LG2 and a first small gear SG1. This first small gear SG1 is engaged with the first large gear LG1.

Also mounted onto an extension of this auxiliary shaft AS is an eccentric means EM that operates a preferably bistable switch means SM once for each complete revolution of shaft AS. This switch means has two terminals, both of which are connected with an integrated circuit IC.

A small DC motor DCM is mounted on rear surface RS. On the output shaft OS of this DC motor is mounted a second small gear SG2. This second small gear SG2 is engaged with the second large gear LG2. The DC motor has two electrical power input terminals MIT1 and MIT2.

A first battery Ba is positioned on the left hand side of rear surface RS; and a second battery Bb is positioned on the right hand side of rear surface RS. Battery Ba has a Ba– terminal and a Ba+ terminal, with the Ba– terminal being of negative polarity with respect to the Ba+ terminal. Similarly, battery Bb has a Bb– terminal and a Bb+ terminal, with the Bb– terminal being of negative polarity with respect to the Bb+ terminal. The Ba+ terminal is electrically connected with the DC motor's MIT2 terminal as well as with the Bb– terminal.

Integrated circuit IC and a quartz element QE are located near the upper part of the actuator means—in a position that would be substantially directly underneath the numeric display means NDM of FIG. 2b. This IC has a relatively large number of electrical terminals, most of which are connected with the quartz element QE, the numeric display means NDM, the programming keys PK1 to PK9, and the program-over-ride keys PORK1 and PORK2. However, for sake of clarity, and also since they form no part of the present invention, the detailed electrical connections between the IC and QE, NDM, PK1 to PK9, PORK1 and PORK2 are not shown.

The remaining IC electrical terminals and connections are shown: electrical power input terminal PITa is electrically connected with battery terminal Ba−; electrical power input terminal PITb is electrically connected with battery terminal Bb+; electrical power output terminal POT is electrically connected with motor input terminal MIT1; and the two terminals of switch means SM is connected with two control input terminals on the IC.

As indicated in FIG. 3, the size and shape of the overall actuator means is such as to fit well within the confines of the face plate. To provide for attractive styling, the unit's depth or thickness dimension has been made as shallow as permissible by the size of the dimming control lever, yet without having this lever exposed.

The relatively large program-over-ride keys PORK1 and PORK2 can be lifted away, thereby to expose the dimming control lever for direct manual actuation—over-riding the motor/gear/linkage mechanism if necessary.

To permit such over-ride, the actuator frame AF is fastened to the notched endless belts NEBa and NEBb by way of a detent means, thereby allowing slippage between belts and actuator frame when force exceeds a certain predetermined level.

To permit the size and shape of subject actuator means to be as compact as desired, which degree of compactness is in effect specified by FIG. 3, it is important that the individual components comprised within the actuator means be fittingly small. In practical reality, this concern is only important in respect to the battery and the motor.

Thus, the electrical power required to be supplied from the built-in battery must be modest enough to permit this battery to be small enough to reasonably fit within the desired specified dimensions of the actuator means. Similarly, the mechanical power required to be supplied by the built-in motor must be modest enough to permit this motor to be small enough to reasonably fit within the specified dimensions.

Since a certain amount of energy is required to effect actuation of the dimming control lever, the power required is inversely proportional to the time allowed to effect this actuation. Thus, by way of a speed-reducing gear mechanism, it becomes possible to actuate the control lever at an arbitrarily small power level.

By allowing complete control lever actuation, from its extreme fully-ON position to its extreme fully-OFF position, to take about one second from start to finish, the motor power output requirement gets to be acceptably modest; and actuation can then readily be accomplished by way of a substantially conventional miniature DC motor of dimensions no larger than 10 mm×20 mm×20 mm. Correspondingly, the electrical power required by the motor now becomes adequately modest to permit the use of two ordinary AAA-cells for the built-in battery.

During the process of actuation, actuator frame AF is apt to slide up and down on the rim of the support frame SF. Also, as the control lever is being pushed up or down by the actuator frame, there is a degree of sliding between the control lever and the inner edges of the actuator frame. To minimize power waste, low-friction surfaces have been provided.

The light dimmer behind the face plate of FIG. 1 is of the type that provides for gradual control of light in a way that is substantially proportional to the position of the control lever: the higher the position, the more light provided; the lower the position, the less light provided. One type of light dimmer that functions in this fashion is the so-called Light Demand Switch, which is marketed by Power Controls Corporation, San Antonio, Tex. 78216.

Details of Operation

With reference to FIG. 4, when the DC motor is provided with a DC voltage across its electrical input terminals, the motor's output shaft will rotate in a direction corresponding to the polarity of this DC voltage. The rotating motor shaft will, by way of the indicated gear and pulley arrangement, cause the actuator frame to move up or down., thereby causing the dimming control lever DCL to move correspondingly. With the MIT1 terminal being positive with respect to the MIT2 terminal, the motor shaft rotates in such a direction as to cause the actuator frame to move the control lever in the down-direction, thereby causing the lights controlled by the light dimmer to gradually diminish in intensity—eventually to be turned OFF altogether.

Correspondingly, with the MIT1 terminal being negative with respect to the MIT2 terminal, the motor shaft rotates in such a direction as to cause the actuator frame to move the switch lever in the up-direction, thereby causing the lights controlled by the light dimmer to gradually increase in intensity eventually to be turned ON altogether.

The overall function of the actuator/timer unit involves the programmed actuation by the IC of the DC motor in the one or the other direction, thereby moving the dimming control lever either up or down to correspondingly increase or decrease light intensity. The quartz element in combination with the IC acts as an accurate clock, and therefore as an accurate time-base for providing programmable diurnally repetitive actuations of the dimming control lever.

With reference to FIG. 3, once mounted in its place on a standard wall switch, the operation and programming of subject actuator means is accomplished as follows.

a) By momentarily depressing PK1, the dimming control lever will be moved a predetermined small distance toward its fully-ON position. By repeating this operation, the dimming control lever can be step-wise moved toward its fully-ON position. Similarly, by momentarily depressing PK2, the dimming control lever will be moved a predetermined small distance toward its fully-OFF position; and by repeating this operation, the dimming control lever can be moved step-wise toward its fully-OFF position. Thus, by repeatedly depressing either PK1 or PK2, the light output may be set at any desired level.

b) Time-of-day is programmed into the actuator means by first momentarily depressing PK3, and then by depressing the hour-roll key PK4 and the minute-roll key PK5 until the correct hour and minute are displayed on the numeric display means NDM. After correct time-of-day is reached, PK3 is depressed once more, thereby securing the time-of-day setting.

c) A light actuation program is established by the following sequence of actions: i) momentarily depress PK6; ii) by way of PK1 or PK2, select the desired light output level; iii) by way of PK3 and PK4, select the time of the day at which this desired light level is to start; and iv) momentarily depress PK6 again. By following the same procedure with PK7, PK8 and PK9, up to three additional light levels and/or actuation times can be programmed into the actuator means; whereafter the actuator means will proceed to execute the various desired actuations at the programmed points in time, while the numeric display means NDM indicates current time-of-day.

d) Adjustment of the program-over-ride-key PORK1 is accomplished by: i) momentarily depressing PORK1; ii) adjusting the light output to desired level by using PK1 and PK2; and iii) momentarily depress PORK1; whereafter, each time PORK1 is momentarily depressed once, the light will attain this desired level. By momentarily depressing PORK1 once more, the light level reverts to whatever the preset program calls for at that time.

e) Adjustment of program-over-ride-key PORK2 is accomplished in a manner that is entirely analogous to that used for adjusting program-over-ride-key PORK1.

f) With additional reference to FIG. 5, as auxiliary shaft AS revolves, switch means SM opens and closes once for each revolution. This effect is used for accomplishing the step-wise movement that can be actuated by the PK1/PK2 keys. Specifically, when PK1 is momentarily depressed, the IC is initiated to provide voltage to the motor of such polarity as to cause the control lever to start moving toward the fully-ON position. However, this movement is stopped as soon as eccentric means EM causes switch means SM to close, thereby causing the IC to stop providing voltage to the motor. An additional momentary push on the PK1 key re-initiates the IC to again provide voltage to the motor, but only until switch means SM again closes, etc.

With the particular gear ratios chosen, auxiliary shaft AS performs 24 complete revolutions while the dimming control lever moves all the way between its fully-ON position to its fully-OFF position. Thus, with one closing of switch means SM per revolution, it takes 24 momentary pushes of the PK1 key to move the dimming control lever all the way from its fully-OFF position to its fully-ON position.

Comments

It is not necessary to use a center-tapped battery for the proper operation of the actuator/timer unit. A single battery could be used in conjunction with providing for double-pole double-throw switching, either by the IC or by mechanical means actuated in accordance with the position of the actuator frame. Or, as yet another alternative, it would be possible to use a regular two-terminal battery in combination with a three-terminal motor.

It is important to notice that subject actuator means is totally independent of power from the power line; which implies that there is no loss of programming in case of a power failure.

Although the linkage/coupling mechanism would have to be modified, subject actuator means can be designed so as to work with a light dimmer having a rotary control knob instead of a control lever.

Also, the actuator means can be used directly for programmed actuation of a more-or-less ordinary toggle switch.

In its preferred embodiment, subject actuator means has a built-in diurnal cycle; which is to say that whatever light control pattern that is programmed into this actuator means will automatically repeat every 24 hours. However, it is routinely possible to provide for other programming periods. For instance, in many cases a seven-day cycle would be advantageous.

Also, subject actuator may be used for applications other than that of dimming lights. For instance, it may be used to control power supplied to an electric heating means that is connected with the power line by way of a suitable light dimmer or toggle switch.

It is not necessary to have the actuator means mounted on the wall switch cover plate in order to effect programming. Rather, especially in respect to actuation times, full programming can be accomplished before mounting.

The adhesive mounting tape is so chosen that the actuator unit can be securely mounted simply by being pressed onto the front surface of the wall switch face plate. Also, it can normally be removed without leaving any mark on the face plate; although it may then be necessary to apply a new piece of mounting tape before re-mounting.

Instead of the notched pulleys and belts described in connection with FIG. 4, it is possible to use gears and gear-belts (such as so-called timing belts).

The IC described in connection with FIG. 5 will have to be designed to provide the particular programming functions specified. However, an IC of such design represents a routine undertaking and forms no part of the present invention.

It is believed that the present invention and its several attendant advantages and features will be understood from the preceding description. However, without departing from the spirit of the invention, changes may be made in its form and in the construction and interrelationships of its component parts, the form herein presented merely representing the presently preferred embodiment.

I claim:

1. Actuator means adapted to be mounted on the front of a wall switch face plate having an aperture and a front surface, said actuator means being operable repeatedly to adjust, in accordance with a preset program, the position of a control lever protruding through this aperture, said control lever being connected in controlling relationship with a power control means located behind said face plate, said power control means being operable to control to different levels the flow of power to a load, said actuator means comprising:

structure means adapted to be mounted on the front of said face plate;

energy source means physically supported by said structure means and operable to supply operative power;

mechanical actuator means physically supported by said structure means and operable to engage with and, when so engaged and when receiving operative power, to cause movement of said control lever; and programming means connected in circuit between said energy source means and said mechanical actuator means, said programming means: i) having clock means, ii) being receptive of programming instructions to establish said preset program, and iii) being operable to provide operative power to said mechanical actuator means in accordance with said instructions, thereby to cause movement of said control lever in accordance with said preset program.

2. The actuator means of claim 1 wherein said switch lever has a first position at which substantially no power is provided to said load and a second position at which a maximum amount of power is provided to said load, and wherein said mechanical actuator means is operable to move said control lever into any one of numerous possible positions between said first position and said second position.

3. The actuator means of claim 1 wherein said structure means is operable to be attached to the front of said face plate by way of adhesive means.

4. The actuator means of claim 1 wherein said energy source means comprises an electric battery.

5. The actuator means of claim 1 wherein said mechanical actuator means comprises an electric motor.

6. The actuator means of claim 1 wherein said programming means comprises display means operable to provide visually discernible information indicative of said programming instructions.

7. The actuator means of claim 1 wherein said programming means comprises display means operable to provide visually discernible information indicative of current time-of-day.

8. The actuator means of claim 1 wherein said programming means comprises mechanically actuatable input means operative to permit manual receipt of programming instructions, thereby to permit modifications of said preset program.

9. The actuator means of claim 1 wherein said programming means is operative to provide said operative power to said mechanical actuator means at any time-of-day, regardless of the time-of-day at which said programming instructions were received.

10. The actuator means of claim 1 wherein said programming means is operable automatically to provide said operative power to said mechanical actuator means at least two times during each of two or more successive 24 hour periods.

11. The actuator means of claim 1 wherein, after said actuator means has been mounted in front of said face plate, said structure means, said energy source means, said mechanical actuator means, and said programming means are all comprised within the space existing between said front surface and a plane in front of and parallel with said front surface, and wherein the shortest distance between said front surface and said plane is approximately the same as the maximum distance by which said control lever protrudes from said front surface.

12. The actuator means of claim 11 wherein said maximum distance is approximately 15 milli-meters.

13. The actuator means of claim 1 in which said program provides for said control lever to be moved in a cyclically repeated manner.

14. The actuator means of claim 13 wherein said program provides for said control lever to be moved in a diurnally repeated manner.

15. For a power control means adapted to be mounted at a regular wall switch box and to be connected in circuit between an ordinary electric utility power line and a load, said power control means having a control lever operable to control the amount of power flowing from said power line to said load, there being a substantially analogue relationship between the physical position of said control lever and the amount of power flowing, the improvement comprising:

programmable actuating means operable to control the physical position of said control lever, said actuating means being receptive of program instructions, thereby to permit control of the amount of power flowing to said load in accordance with said program instructions.

16. An arrangement comprising:

a wall switch having a face plate with an aperture through which a switch lever is protruding; the face plate, when viewed from a position in front of the wall switch, having a periphery; the switch lever, when actuated, being operative to control the flow of power to a load connected with a pair of conductors coming into the wall switch; and actuator means having an opening adapted to receive said switch lever; the actuator means being mounted on the face plate within its periphery and in such manner that the switch lever is indeed received by said opening; the actuator means being operative to cause the switch lever to be actuated in accordance with a pre-programmed pattern, thereby accordingly to control the flow of power to the load.

17. An arrangement comprising:

actuator means having a rear opening operative to receive the switch lever protruding from the face plate of a wall switch; the actuator means being operative, after indeed having received said switch lever, to cause the switch lever to be moved back and forth in accordance with a desired time pattern; the actuator means being characterized by including a battery and an electric motor; and mounting means operative to permit mounting of the actuator means onto a wall switch and in such manner as to receive the switch lever thereof.

18. A combination comprising:

wall switch means having a control lever projecting through the aperture of an ordinary wall switch face plate; the wall switch means being connected in circuit between an ordinary electric utility power line and a load; and programmable actuating means mounted onto the face plate; the actuating means mechanically engaging the control lever and being operable to control the physical position thereof in accordance with a preset program; the programmable actuating means including an electric motor and an electric battery; the electric motor being operable, in response to pre-programmed instructions, to cause movement of the control lever.

19. The combination of claim 18 wherein the programmable actuating means is operable to place the control lever in any one of at least three different physical positions.

20. A combination comprising:

a control lever projecting through the aperture of an ordinary wall switch face plate; and actuating means mounted at the face plate; the actuating means being functional to control the physical position of the control lever in accordance with a certain time program; the actuating means being characterized by including a battery and an electric motor.

21. The combination of claim 20 wherein the actuating means is characterized by including a quartz clock means.

22. The combination of claim 20 wherein the actuating means is characterized by permitting modification of the time program.

23. The combination of claim 20 wherein the control lever is connected with and is operative to control a dimming means located behind the face plate.

24. The combination of claim 20 wherein the actuating means is characterized by being functional to place the control lever into any one of at least three different positions.

25. An arrangement comprising:

incandescent lighting means; and control means adapted to connect the lighting means in circuit with the power line voltage of an ordinary electric utility power line and, at least under some conditions, to cause the provision of a lamp voltage thereto; the control means being characterized: (i) by being functional to control the magnitude of the lamp voltage according to pre-programmed instructions; (ii) in response to such pre-programmed instructions, by being functional to cause the magnitude of the lamp voltage to change, from time-to-time, between a first level and a second level; (iii) by including an electro-magnetically actuated switching means functional, upon provising of electric power thereto, to effectuate the change in the magnitude of the lamp voltage between the first level and the second level; and (iv) by including a timing means operative to keep time independent of the power line voltage; the electro-magnetically actuated switching means being further characterized by not requiring the provision of electric power on a continuous basis.

26. The arrangement of claim 25 wherein the control means is further characterized by including a face plate of a type commonly used in combination with a wall switch.

27. The arrangement of claim 25 wherein the control means is further characterized by including a quartz clock means.

28. An arrangement comprising:
an electric lamp; and
power controller series-connected with the lamp to form a series-combination; the series-combination being connected across the power line voltage of an ordinary electric utility power line; the power controller being characterized: (i) by controlling, over a period of time, the amount of power supplied to the lamp according to pre-programmed instructions; (ii) in response to such pre-programmed instructions and within said period of time, by causing at certain points in time a change in the amount of power supplied to the lamp; (iii) by including an electro-mechanical switching device functional, upon provision of electric actuation power thereto, to effectuate the change in the amount of power supplied to the lamp; and (iv) by including a timing means operative to keep time independent of the power line voltage; the electro-mechanical switching means requiring for proper operation to be provided with electric actuation power only during a part of said period.

29. An arrangement comprising:
an electric lamp; and
a programmable wall-switch-mounted structure operative during a given span of time, at different pre-programmed times within this span of time, repeatedly to connect & disconnect the electric lamp to & from an electric utility power line; the programmable wall-switch-mounted structure being further characterized (i) by including a wall switch face plate having a central aperture; (ii) by including a quartz element for establishing accurate time references; (iii) by including a numeric display functional to indicate time-of-day to a person standing in front of the programmable wall-switch-mounted structure; and (iv) by effectuating connections & disconnections with the help of means protruding through the aperture; and (v) by not having an electrical receptacle means mounted at or near the central aperture.

30. The arrangement of claim 29 wherein the programmable wall-switch-mounted structure is additionally characterized by including an electro-mechanical actuator means operative, in response to being supplied with electric actuation power, to effectuate the connections & disconnections; the electro-mechanical actuator means being characterized by being supplied with electric actuation power only during a part of the complete duration of said span of time.

31. An arrangement comprising:
an electric lamp; and
an assembly mounted at the location of a wall switch having a face plate with a central aperture; the assembly being programmable and operative at different pre-programmed times to connect & disconnect the electric lamp to & from an electric utility power line; the assembly being further characterized: (i) by including a quartz element for establishing accurate time references; (ii) by effectuating connections & disconnections to & from the power line with the help of means protruding through the aperture; (iii) by including a numeric display operative to indicate time-of-day to a person standing in front of the wall switch; and (iv) by not having an electrical receptacle means mounted at or near the central aperture.

32. An arrangement comprising:
an electric load; and
an assembly operative at different pre-programmed times to connect & disconnect the electric load to & from an electric utility power line; the assembly being further characterized: (i) by being programmable; (ii) by including a quartz element for establishing accurate timing for effectuating pre-programmed timed connections and disconnections between the electric load and the electric utility power line, with the timing being independent of the frequency of any voltage present at the electric utility power line, and with the connections between the electric load and the electric utility power line being effectuated by way of metal-to-metal contact; (iii) by being mounted at a wall plate operative to cover an opening in a wall, within which opening conductors from the electric utility power line are present; (iv) by including a numeric display operative to indicate time-of-day, the numeric display being characterized by having no mechanically moving parts; and (v) by including a battery operative to power the quartz element and the numeric display.

33. An arrangement comprising:
an electric load; and
an assembly mounted at the location of a wall plate covering an opening in a wall, within which opening exist conductors connected with an electric utility power line; the assembly being programmable and operative at different preprogrammed times to connect & disconnect the electric lamp to & from the electric utility power line; the assembly being further characterized: (i) by including a quartz element for maintaining an accurate time base independent of the frequency of any voltage on the electric utility power line; (ii) by including a numeric display operative to indicate time-of-day, the numeric display being additionally characterized by not having any mechanically moving parts; (iii) by making connection between the electrical load and the electric utility power line by way of metal-to-metal contact surfaces; and (iv) by including a battery operative to power the quartz element and the numeric display.

* * * * *